(Model.)

A. NORRIS.
GOPHER TRAP.

No. 243,953.

Patented July 5, 1881.

Witnesses:
J. C. Gillespie
J. T. Ariton

Inventor:
Abram Norris

UNITED STATES PATENT OFFICE.

ABRAM NORRIS, OF GONZALES COUNTY, TEXAS.

GOPHER-TRAP.

SPECIFICATION forming part of Letters Patent No. 243,953, dated July 5, 1881.

Application filed August 10, 1880. (Model.)

*To all whom it may concern:*

Be it known that I, ABRAM NORRIS, a citizen of the United States, residing near Rancho, in the county of Gonzales and State of Texas, have invented a new and useful Trap for Catching Gophers and other Underground Animals, of which the following is a specification.

My invention relates to that form of trap in which a pivoted jaw is operated by means of a spring, the parts being so constructed and arranged that when the trap is set the spring is wound up or compressed, and held in that position by means of a trigger engaging with a treadle to be operated by the animal.

Figure 1:
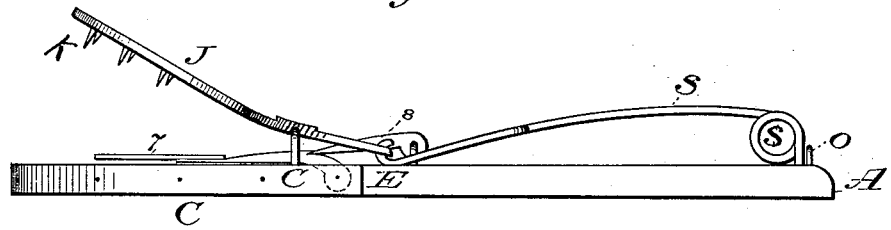
Figure 2:
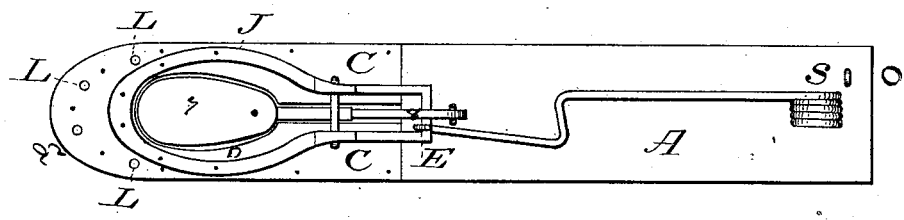

In the accompanying drawings, Figure 1 represents a side elevation of my improved trap when set, and Fig. 2 represents a plan view thereof.

The base A of the trap consists of a board of suitable length and width, and tapering in thickness from one inch at the heel to a half-inch at the point, which is rounded, as shown. The point of the base-board is covered by a sheet of tin, C, as shown. An oblong hole, D, of suitable size for the passage of the animal, is made in the central portion of the point, and has a saw-gash extending back therefrom, in which the heel of the treadle 7 is pivoted. The treadle is made of tin, and of a size and shape to work in the hole D and engage with the trigger 8, which is made of wire and fastened to the base A by a small loop and staple.

The jaw J of the trap is made of iron, and the front portion resembles a mule-shoe in shape, while the rear portion is in the shape of a square staple, and said jaw is hinged or pivoted on the base by means of a wire staple passing through the jaw and entering the base. The jaw J is provided with pointed iron teeth K, and there are holes L in the base-board A to receive said teeth when the trap is sprung.

A wire spring, S, having a suitable number of coils formed therein, is secured to the heel of the base-board A, and the end thereof extends forward, and is connected with the rear end of the jaw J by means of a hook, E, as shown.

A small staple, o, is placed in the heel of the base, by which the trap can be secured to prevent it from being carried off.

The trap is used without bait, and is set, as shown in Fig. 1, by depressing the jaw and spring at the point of their connection and engaging the trigger with a notch in the heel of the treadle. The trap is placed at the mouth of the gopher-hole, which is cleaned out, and the ground in front is also scraped away, so as to let the trap rest even with the bottom of the hole, so that the passage of the animal will operate the treadle and spring the trap, whereby the animal is caught. The trap is covered, so as to darken it and keep it from the view of the animal.

I am aware that it is not new to operate a spring-jaw trap by means of a treadle and trigger, and therefore do not broadly claim the same; but What I do claim as my invention, and desire to secure by Letters Patent, is—

The combination of the base-board A, jaw K, spring S, treadle 7, and trigger 8, substantially as and for the purpose set forth.

ABRAM NORRIS.

Witnesses:
B. F. SCALLORN,
J. K. P. GREEN.